March 31, 1931. G. C. WAHL 1,798,570
FEEDER FOR WOODWORKING MACHINES
Filed June 30, 1930
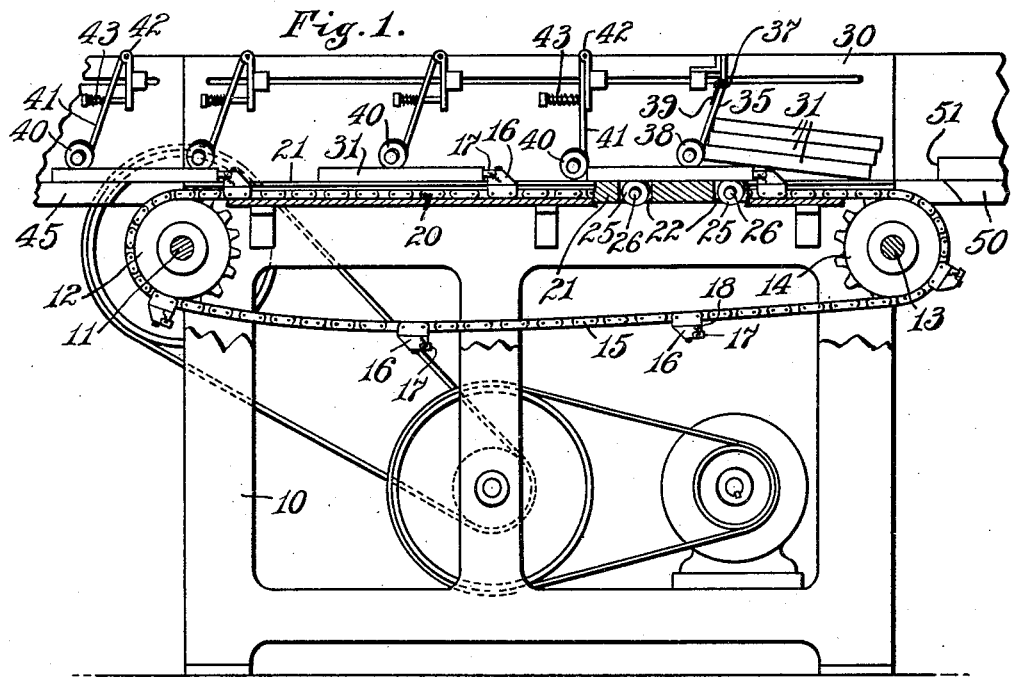
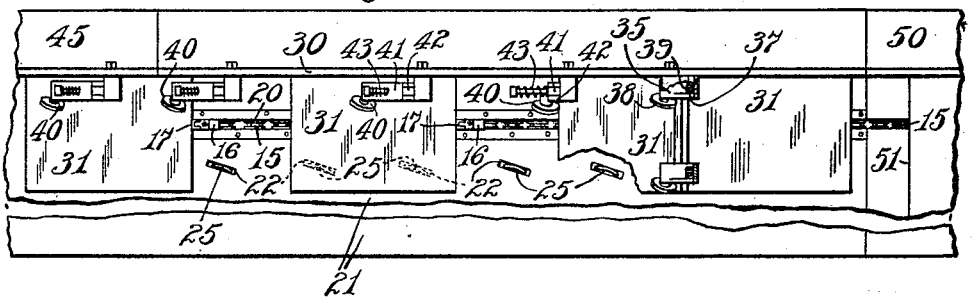
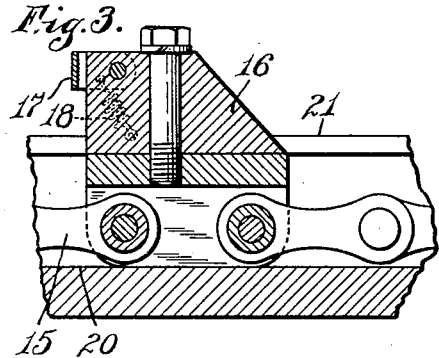
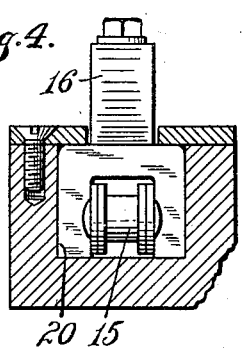
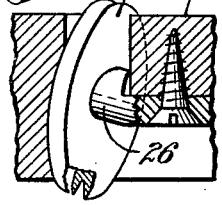
INVENTOR.
George C. Wahl,
BY
Hood & Hahn
ATTORNEYS Patented Mar. 31, 1931

1,798,570

UNITED STATES PATENT OFFICE

GEORGE C. WAHL, OF INDIANAPOLIS, INDIANA, ASSIGNOR TO INDIANAPOLIS WIRE BOUND BOX COMPANY, OF INDIANAPOLIS, INDIANA, A CORPORATION OF INDIANA

FEEDER FOR WOODWORKING MACHINES

Application filed June 30, 1930. Serial No. 464,757.

The object of my invention is to provide an apparatus capable of delivering successive articles from the bottom of a supply pile in accurately positioned relation to a subsequent-acting mechanism.

The accompanying drawings illustrate an embodiment of my invention wherein the articles are boards of indefinite width to be successively presented accurately-positioned as to one edge with relation to sawing mechanism designed to cut the boards into narrow strips suitable for use, say, as cleats for wire bound boxes.

Fig. 1 is a side elevation and partial vertical section;

Fig. 2 is a fragmentary plan;

Fig. 3 is a vertical section, on a plane parallel with Fig. 2, on a larger scale, of one of the pusher elements;

Fig. 4 is a transverse section of the view shown in Fig. 3, and

Fig. 5 is a fragmentary detail of one of the crowding wheels.

In the drawings 10 indicates a main frame in which are journaled a driving shaft 11 carrying a driving sprocket 12, and an idler shaft 13 carrying a sprocket wheel 14. Passing over sprockets 12 and 14 is a feed chain 15 having spaced pusher blocks 16 preferably conveniently provided with pivotally mounted pusher bars 17 yieldingly urged toward active position by springs 18. The upper run of belt 15 traverses a guideway 20 in the surface of platform 21 forming part of the main frame. Platform 21 is provided with a series of slots 22 arranged en echelon in a series parallel with the guideway 20, and in each of these slots is journaled a pusher wheel 25 each journaled upon a pin 26. The peripheries of the pusher wheels 25 project slightly above the upper surface of the platform 21 and said wheels are canted at an angle to the plane of said upper surface as indicated in the drawings.

Arranged above the work table at one side is a fence 30 which forms a guide for the accurate positioning of one edge of the articles 31.

At the receiving end of the machine I provide, above the work table, a pair of swinging arms 35 each of which depends from a pivotal mounting 37 and at its lower end is provided with a pusher wheel 38, each of said arms being yieldingly urged by a spring 39 toward the receiving end of the machine to a position where the lower edge of the pusher wheel is vertically spaced from the upper edge of a subjacent pusher wheel 25 by an amount less than the vertical dimension of the articles 31 to be handled. Arranged en echelon with the wheel 38 nearest fence 30 in a series parallel with guide 20 are several pusher wheels 40 each carried at the lower end of a swinging arm 41 depending from a pivotal support 42 and yieldingly urged toward the receiving end of the machine by a spring 43. The pusher wheels 38 and 40 are canted from the vertical and the arrangement of the several pusher wheels is such that as the articles 31 are forced between the upper and lower sets of pusher wheels, said pusher wheels will act to crowd the articles 31 up against fence 30 so that, by the time said articles reach the machine 45, they will be accurately positioned with one edge against said fence.

Springs 39 and 43 are of sufficient force to firmly clamp the articles 31 between the upper and lower sets of pusher wheels and the initial elements 35—38 serve as a dam to prevent forwarding movement of all but the lowest one of a supply of such articles at the receiving end of the machine, as indicated in Fig. 1.

The pusher wheels may be made of any suitable material, as for instance metal or hard rubber, and if made of metal may conveniently be circumferentially grooved, as indicated in Fig. 5 so as to provide the necessary lateral component of reaction between the articles 31 and the pusher wheels as said articles are forwarded through the machine.

I have found in practice that, where the articles 31 are soft wood, successful operation is obtained with the pusher wheels inclined to the line of movement of the feeder belt at an angle of approximately fifteen degrees and canted away from the vertical about fifteen degrees, and that there may be a considerable variation from this angularity.

A supply of articles 31 may be maintained upon a preliminary work table 50 (Fig. 1) and, in order to insure that the rear end of the lowermost article of the immediate supply at the entrance end of the machine shall be in advance of the oncoming pusher 16, a ledge 51 is provided, as shown in Figs. 1 and 2.

The pivotally supported element 17 is provided to prevent the pusher 16 from dragging upon the rear end of the article 31 as the pusher passes downwardly over sprocket wheel 12.

I claim as my invention:

1. An article feeder comprising a work table having an article guide-fence arranged lengthwise thereof, an endless feeder belt traversing the work table and parallel with said guide fence, a series of pusher rollers projected upwardly through said work table en echelon relative to the guide-fence, a series of upwardly yielding pusher wheels arranged over the work table, means for yieldingly urging said pusher wheels downwardly, means carried by the feeder belt for engaging articles on the work table and projecting them thereover between the upper and lower pusher wheels, the said pusher wheels being arranged en echelon relative to the guide-fence.

2. A feeder of the character specified in claim 1 wherein the upper pusher wheels are journaled upon the lower ends of depending pivotally supported arms.

3. A feeder of the character specified in claim 1 wherein the article engaging elements of the feeder belt are members pivoted upon horizontal pivots carried by laterally projected elements of the feeder belt.

4. An article feeder comprising a work table having an article guide fence arranged lengthwise thereof, an article-obstruction arranged above the work table in position to provide a space at the receiving end of the work table for the reception of a vertical stack of articles and spaced above said table in a position to obstruct forward movement of the second article from the bottom in said stack, means for successively projecting the lowermost article of the stack beneath said obstruction substantially parallel with the guide fence, and an upwardly yielding pusher wheel arranged above the work table on an axis at an angle to the guide fence and in position to engage the upper surfaces of articles pushed thereunder to crowd said articles toward the guide fence, and a second pusher wheel projected upwardly through the work table in cooperative relation with the other pusher wheel.

In witness whereof, I have hereunto set my hand at Indianapolis, Indiana, this 4th day of June, A. D. one thousand nine hundred and thirty.

GEORGE C. WAHL.